US008626830B2

(12) United States Patent  (10) Patent No.: US 8,626,830 B2
Goldfarb et al.  (45) Date of Patent: Jan. 7, 2014

(54) MEDIA CONTENT AT THE END OF A COMMUNICATION

(75) Inventors: David Elliot Goldfarb, Bet Shemesh (IL); Jonathan William Medved, Jerusalem (IL)

(73) Assignee: Vringo Inc., New York, NY (US)

( * ) Notice: Subject to any disclaimer, the term of this patent is extended or adjusted under 35 U.S.C. 154(b) by 472 days.

(21) Appl. No.: 11/549,658

(22) Filed: Oct. 16, 2006

(65) Prior Publication Data

US 2007/0192428 A1  Aug. 16, 2007

Related U.S. Application Data

(60) Provisional application No. 60/771,883, filed on Feb. 10, 2006, provisional application No. 60/772,564, filed on Feb. 13, 2006, provisional application No. 60/819,621, filed on Jul. 11, 2006, provisional application No. 60/841,233, filed on Aug. 31, 2006.

(51) Int. Cl.
*G06F 15/16* (2006.01)

(52) U.S. Cl.
USPC ........... 709/204; 709/200; 709/216; 709/219; 709/224; 709/230

(58) Field of Classification Search
USPC .................. 709/204, 200, 216, 219, 224, 230
See application file for complete search history.

(56) References Cited

U.S. PATENT DOCUMENTS

| | | | | |
|---|---|---|---|---|
| 5,321,739 A * | 6/1994 | Higashiyama | ............. | 455/412.1 |
| 5,371,781 A | 12/1994 | Ardon | | |
| 5,784,568 A * | 7/1998 | Needham | ....................... | 709/234 |
| 5,991,824 A * | 11/1999 | Strand et al. | ....................... | 710/1 |
| 5,999,525 A * | 12/1999 | Krishnaswamy et al. | .... | 370/352 |
| 6,014,086 A * | 1/2000 | Miyashita | ....................... | 340/7.6 |
| 6,034,687 A * | 3/2000 | Taylor et al. | ................... | 715/775 |
| 6,094,587 A | 7/2000 | Armanto et al. | | |
| 6,226,672 B1 * | 5/2001 | DeMartin et al. | ............. | 709/219 |
| 6,310,944 B1 | 10/2001 | Brisebois et al. | | |
| 6,731,323 B2 * | 5/2004 | Doss et al. | .................. | 348/14.01 |
| 6,775,689 B1 * | 8/2004 | Raghunandan | ............... | 709/206 |

(Continued)

FOREIGN PATENT DOCUMENTS

| EP | 1505814 | 2/2005 |
|---|---|---|
| EP | 1278361 | 1/2006 |

(Continued)

OTHER PUBLICATIONS

Anne B. McDonald; Video IM Services Face Off; Jun. 2004; PC World; pp. 58-59 and disclaimer, 3 pages. Anne B. McDonald; Video IM Services Face Off; Jun. 2004; PC World; pp. 58-59 and disclaimer, 3 pages.*

(Continued)

*Primary Examiner* — Thuong Nguyen
*Assistant Examiner* — Anthony Fabbri
(74) *Attorney, Agent, or Firm* — Cozen O'Connor (57) ABSTRACT

A method includes playing a video clip upon the end of a communication between two users. Another method includes playing an audio clip upon the end of a communication between two users. The audio clip may have been downloaded to a device of at least one of the users or it may be selected by a first user for playing on the device of a second user.

8 Claims, 8 Drawing Sheets

(56) References Cited

U.S. PATENT DOCUMENTS

| | | | |
|---|---|---|---|
| 6,778,648 B1* | 8/2004 | Alston et al. | 379/93.27 |
| 7,006,608 B2 | 2/2006 | Seelig et al. | |
| 7,088,816 B2* | 8/2006 | Donnelly | 379/373.01 |
| 7,412,041 B2* | 8/2008 | Koskela | 379/142.05 |
| 7,761,816 B2* | 7/2010 | Goldfarb et al. | 715/864 |
| 8,041,401 B2* | 10/2011 | Goldfarb | 455/567 |
| 2001/0050977 A1* | 12/2001 | Gerszber et al. | 379/88.13 |
| 2002/0028665 A1* | 3/2002 | Mankovitz | 455/186.1 |
| 2002/0032905 A1 | 3/2002 | Sherr et al. | |
| 2002/0065074 A1 | 5/2002 | Cohn et al. | |
| 2002/0067816 A1* | 6/2002 | Bushnell | 379/201.02 |
| 2002/0163532 A1* | 11/2002 | Thomas et al. | 345/723 |
| 2003/0032415 A1 | 2/2003 | Cho | |
| 2003/0033214 A1* | 2/2003 | Mikkelsen et al. | 705/26 |
| 2003/0131353 A1* | 7/2003 | Blom et al. | 725/25 |
| 2003/0193558 A1* | 10/2003 | Doss et al. | 348/14.01 |
| 2003/0224762 A1* | 12/2003 | Lau et al. | 455/412.2 |
| 2004/0078382 A1 | 4/2004 | Mercer et al. | |
| 2004/0120494 A1* | 6/2004 | Jiang et al. | 379/210.01 |
| 2004/0158712 A1* | 8/2004 | Lee et al. | 713/165 |
| 2004/0203712 A1* | 10/2004 | Murai et al. | 455/422.1 |
| 2004/0223605 A1* | 11/2004 | Donnelly | 379/373.01 |
| 2004/0235568 A1 | 11/2004 | Kim | |
| 2004/0260824 A1 | 12/2004 | Berard et al. | |
| 2005/0054361 A1* | 3/2005 | Turcanu et al. | 455/518 |
| 2005/0124290 A1* | 6/2005 | Bostrom et al. | 455/3.06 |
| 2005/0143103 A1 | 6/2005 | Bjorgan et al. | |
| 2005/0258938 A1* | 11/2005 | Moulson | 340/7.58 |
| 2005/0262186 A1* | 11/2005 | Szeto et al. | 709/203 |
| 2006/0026277 A1* | 2/2006 | Sutcliffe | 709/224 |
| 2006/0028951 A1 | 2/2006 | Tozun et al. | |
| 2006/0047572 A1 | 3/2006 | Moore et al. | |
| 2006/0052091 A1 | 3/2006 | Onyon et al. | |
| 2006/0153355 A1* | 7/2006 | Wang et al. | 379/215.01 |
| 2006/0170759 A1* | 8/2006 | Roever et al. | 348/14.03 |
| 2006/0177044 A1 | 8/2006 | O'Neil | |
| 2006/0206581 A1* | 9/2006 | Howarth et al. | 709/217 |
| 2006/0258289 A1* | 11/2006 | Dua | 455/41.3 |
| 2006/0258340 A1* | 11/2006 | Eronen | 455/414.1 |
| 2006/0274709 A1 | 12/2006 | Muir, III | |
| 2006/0276174 A1* | 12/2006 | Katz et al. | 455/410 |
| 2006/0288082 A1* | 12/2006 | Rosenberg et al. | 709/217 |
| 2006/0294465 A1 | 12/2006 | Ronen et al. | |
| 2007/0030338 A1 | 2/2007 | Jiang | |
| 2007/0064921 A1* | 3/2007 | Albukerk et al. | 379/373.02 |
| 2007/0121657 A1* | 5/2007 | Boillot et al. | 370/403 |
| 2007/0124452 A1* | 5/2007 | Mohammed | 709/223 |
| 2007/0183354 A1 | 8/2007 | Schuelke et al. | |
| 2007/0189474 A1* | 8/2007 | Cai | 379/142.01 |
| 2007/0190983 A1* | 8/2007 | Goldfarb et al. | 455/414.1 |
| 2007/0198443 A1* | 8/2007 | Chernev et al. | 705/500 |
| 2007/0204008 A1 | 8/2007 | Sindoni | |
| 2007/0207782 A1* | 9/2007 | Tran | 455/414.1 |
| 2007/0223663 A1* | 9/2007 | Benco et al. | 379/142.01 |
| 2007/0226310 A1* | 9/2007 | Shaffer et al. | 709/207 |
| 2007/0260556 A1 | 11/2007 | Pousti | |
| 2008/0022220 A1 | 1/2008 | Cheah | |
| 2008/0052373 A1 | 2/2008 | Pousti | |
| 2008/0064378 A1* | 3/2008 | Kahan et al. | 455/414.1 |
| 2008/0162650 A1* | 7/2008 | Medved et al. | 709/206 |
| 2008/0192108 A1 | 8/2008 | Pelous et al. | |
| 2008/0250066 A1* | 10/2008 | Ekstrand et al. | 707/104.1 |

FOREIGN PATENT DOCUMENTS

| | | |
|---|---|---|
| GB | 2365672 A | 2/2002 |
| WO | WO 2004/056073 | 7/2004 |
| WO | WO 2007/001805 | 1/2007 |

OTHER PUBLICATIONS

Anne B. McDonald; Video IM Services Face Off; Jun. 2004; PC World; pp. 58-59 and disclaimer, 3 pages.*

Bob Gale; Back to the Future Part I; Nov. 22, 1989; Universal Pictures; [Movie clip]; "Thank you for using AT&T".*

"Comverse Presents New Video Services as Part of Its Total Communication Portfolio", Business Wire, Feb. 19, 2004, Woodbury, N.Y.

Comverse, "Partner Communications Company Ltd. Selects Comverse Fun Dial to Expand Portfolio of Entertainment Services", Comverse Press Release, Sep. 15, 2003, Woodbury, N.Y.

Comverse, "Comverse Highlights Expanded Total Communications Portfolio at 3GSM World Congress 2004", Comverse Press Release, Feb. 18, 2004, Woodbury, N.Y.

http://www.comverse.com/data/uploads/products/fun%20Dial%20_BR2006_0184_%20screen.pdf,2006.

http://www.comverse.com/data/uploads/products/fun%20Dial%20_BR2006_0184_%20screen.pdf,2006.

* cited by examiner

| USERNAME | SERVICE | MEDIA FILE |
|---|---|---|
| USER 2 | CALL INITIATION | VID1.3GP |
| USER 2 | CALL RINGING | VID2.3GP |
| USER 2  370 | CALL ENDING | VID3.3GP |
| USER 3 | SERVICE 2 | VID4.3GP |
| USER 3 | SERVICE 1 | VID5.3GP |

| USERNAME | BUDDY |
|---|---|
| USER 1 | USER 2 |
| USER 1 | USER 3 |
| USER 1  364 | USER 7 |
| USER 1 | USER 4 |
| USER 2 | USER 1 |

| USERNAME | BUDDY | SERVICE | SPECIAL MEDIA FILE |
|---|---|---|---|
| USER 1 | USER 2 | CALL RINGING | VID7.3GP |
| USER 1 | USER 3 | | |
| USER 1 | USER 7 | | |
| USER 1 | USER 4 | | |
| USER 2 | USER 1 | CALL INITIATION | VID9.3GP |

FIG. 7

MEDIA CONTENT AT THE END OF A COMMUNICATION

CROSS-REFERENCE TO RELATED APPLICATIONS

This application claims benefit from the following U.S. Provisional Patent Applications 60/771,883, filed Feb. 10, 2006, 60/772,564, filed Feb. 13, 2006, 60/819,621, filed Jul. 11, 2006 and 60/841,233, filed Aug. 31, 2006, all of which are hereby incorporated in their entirety by reference.

FIELD OF THE INVENTION

The present invention relates to communication devices generally and to personalization content sharing on the communication devices by a community of users in particular.

BACKGROUND OF THE INVENTION

Cellular telephones are known in the art. Such devices were originally developed to provide mobile telephony services to users who for reasons of preference, convenience or circumstance required wireless connections to a public telephony network. The earliest cellular telephones were dedicated devices that lacked the capability to be used for other purposes.

Recent cellular telephones have more advanced operating systems that enable users to enrich and personalize their mobile telephony experience. For example, users can display or play media content such as photos, video clips, and audio files.

One of the most popular ways to personalize a mobile user's telephony experience is to select a unique audio ringtone to be played for incoming calls. The ringtone selected by the user overrides the default ringing sound selected by the telephone manufacturer.

Some cellular telephones run software that supports the definition of unique ringtones for a specific contact or for groups of contacts.

Some of these cellular telephones support user definition of a photo or video clip to display when an incoming call is received from a specific contact or group of contacts.

The media files used for these personalization services are available from a variety of sources. A small selection of files is usually pre-loaded on the devices prior to their distribution. The devices also often come equipped with cameras and audio recorders that may be used to create such media files on the devices themselves. Files may also be transferred from other devices in the user's possession via a physical connection or a short range wireless connection technology such as Bluetooth or infra-red. Some media files are also typically downloaded "over the air" across an Internet connection via the connection supplied by the mobile network operator or other media content provider.

Some cellular network operators have introduced "ringback" personalization services, which enable a mobile subscriber to define the audio clip that the network operator will play instead of the normal "ring" for someone calling the subscriber's phone number.

Ringtones and Ringback tones are available in other systems as well. SIP (Session Initiation Protocol), which may be used to connect devices for a voice over IP (VoIP) connection, also provides an option for the selection of alternative tones. The alternative tone may be indicated by a URL (universal resource locator) that may be used to download the tone at the time the connection is made. The download may be performed using a different channel than the VoIP connection.

"Endtone" personalization services may soon be offered by network operators. Endtones may include specialized disconnect tones to notify wireless device users that voice and data connections are terminated. Endtones have been announced by Endtone of the United States.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that there are several barriers to the introduction and success of systems that provide voice connections concurrent with the download and play of media files. Such barriers include, for example, the inability of many current mobile networks to provide concurrent voice and data connections to a single device. Certain variations of a relatively new mobile network technology, known as "3G", are capable of providing concurrent voice and data connections. However, 3G networks may still suffer from latency that may affect the quality when attempting to synchronize the download and play of media files with a voice connection. Furthermore, the repeated downloading of media files is often prohibitively expensive.

Applicants have realized that creating a community to define media files to be played when two friends, or "buddies", communicate may provide the illusion of real time sharing of media content between the two buddies. Such media files may be downloaded to a buddy's device prior to the conversation.

Figure 1:
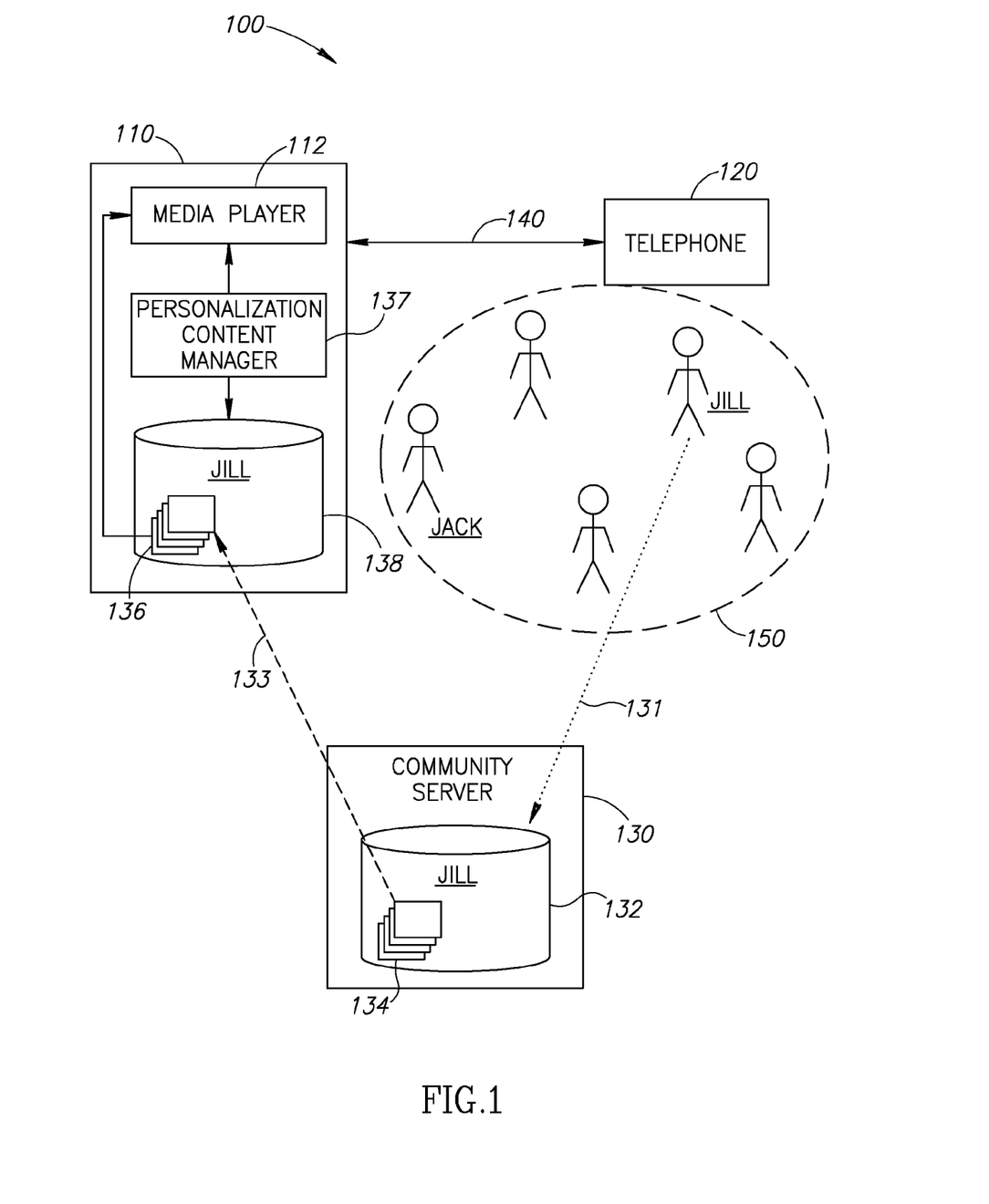
FIG. 1 is a schematic illustration of a novel media content sharing system, constructed and operative in accordance with the present invention.

Reference is now made to FIG. 1, which illustrates a novel media content sharing system 100 capable of providing the illusion of real time sharing of media content between a novel communication device 110, owned by, for example, Jack, and a telephone 120, owned by, for example, Jill, who are simultaneously setting up or using a voice connection 140 for a telephone conversation.

In accordance with one preferred embodiment of the present invention, Jack and Jill may both be members of a media content personalization sharing community 150, organized through a community server 130. Community server 130 may be a web server including, for example, a media file database 132.

Members of community 150, such as Jack and Jill, who elect to share personalization content (i.e. media files, such as photos, audio clips and video clips) with each other are said to be "buddies." Typically, the buddy sets of the members are not the same.

In a preferred embodiment of the present invention, individual members of community 150 may select (arrow 131) media content on community server 130 that they wish some or all of their buddies to see and/or hear. For example, Jill may select a media file 134. At some other time, each member may download (arrow 133), to their own devices 110, the selected media content of his/her buddies. Thus, Jack may download a version 136 of media file 134 to his device 110, where media file 136 may be a version of the file suitable for presentation to Jack on his device. It will be appreciated that such a download may be performed as an occasional automated procedure initiated by Jack's device 110, or as one initiated by Jack, or as one initiated by server 130 in response to new selection 131.

Novel device 110 may be any suitable "smart phone" capable at least of providing telephony services, downloading data, and of presenting a variety of media content. Novel device 110 may include a media player 112 among its standard feature set and, in accordance with a preferred embodiment of the present invention, may also comprise a personalization content manager 137 and a media file storage unit 138 capable of receiving and storing media file 136. Telephone 120 may be a novel communication device like device 110 or it may be any suitable telephone, such as a landline phone, a mobile phone, a digital phone, a VoIP phone, or an analog phone.

On the occasion of a telephone connection between Jack and Jill over voice connection 140, personalization content manager 137 may cause media file 136 selected by Jill to be played on media player 112 of device 110 belonging to Jack. It will be appreciated that, since media file 136 may "belong" to Jill and may be downloaded to device 100 without any intervention from Jack, Jack may have the illusion that media file 136 was provided from Jill across connection 140 at the time of the telephone conversation, without any latency.

It will further be appreciated that media file 136 was not provided concurrently by the operators of voice connection 140, even though Jack may have the illusion otherwise. It will still further be appreciated that media file 136 may be played even on pre-3G devices, as long as such devices can download and play media files.

Figure 2:
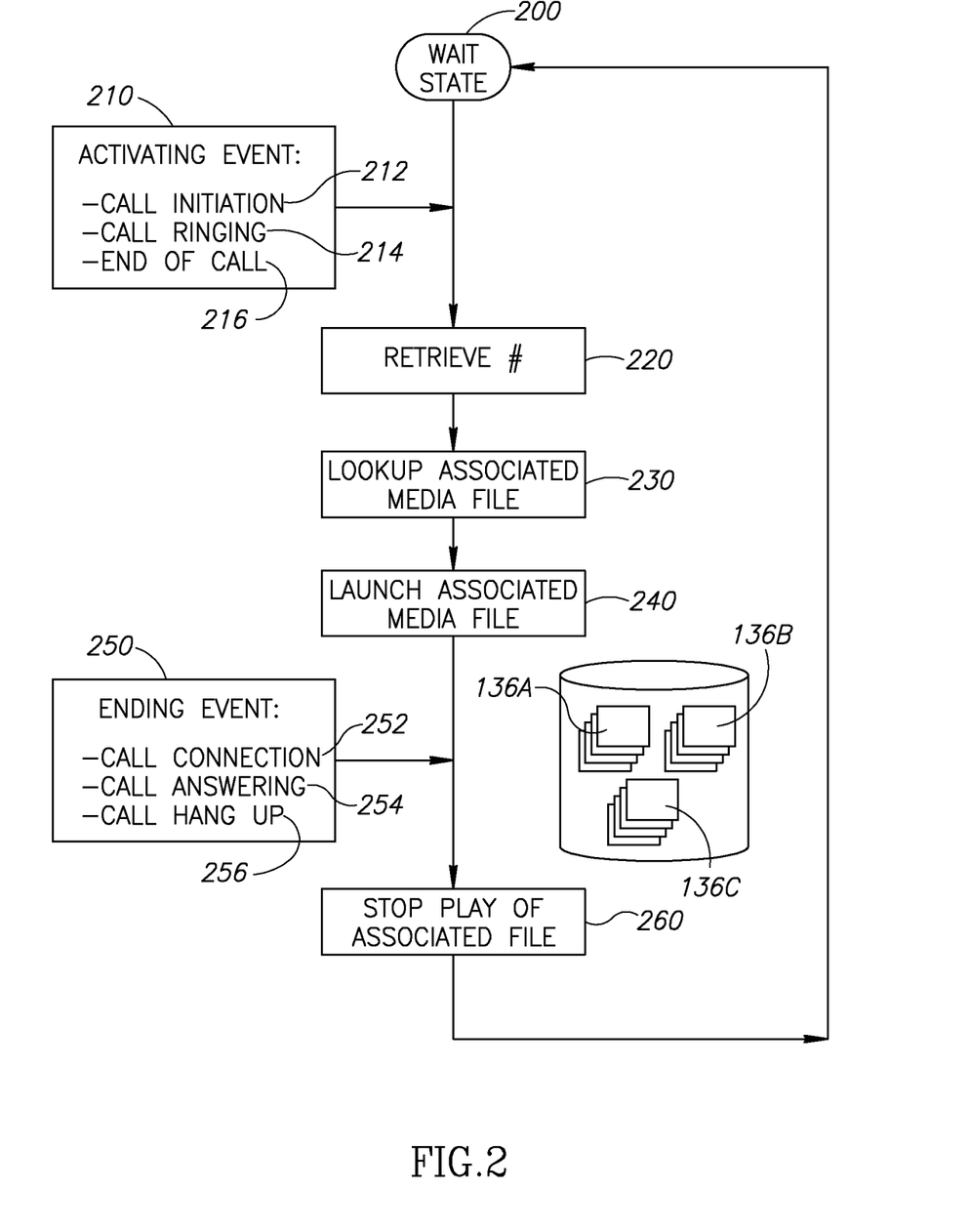
FIG. 2 is a block diagram illustration of the method used by the system of FIG. 1.

Reference is now made to FIG. 2, which illustrates the method performed by device 110 to play media file 136 when simultaneously involved in a voice connection operation with telephone 120.

Personalization content manager 137 may remain (step 200) in a wait state until notification of an activating event 210 is received. Activating event 210 may be, for example, a call initiation 212, a call ringing 214, or an end of call 216. Call initiation 212 may occur when device 110 is used to initiate a call to telephone 120, at the point of dialing or connecting. Call ringing 214 may occur when device 110 detects an incoming call from telephone 120. End of call 216 may occur when a phone conversation between device 110 and telephone 120 ends and is determined by notification of a hang up or idle state.

After activating event 210 may be received, personalization content manager 137 may retrieve (step 220) the telephone number of telephone 120 and may use it to look up (step 230) the media file 136 associated with Jill, whose telephone number was retrieved.

Personalization content manager 137 may then launch (step 240) the associated media file 136 for play by media player 112. Media player 112 may stop at the completion of media file 136 or may continue to play media file 136 in a continuous loop until personalization content manager 137 may receive notification of an ending event 250. Ending event 250 may be, for example, a call connection 252, a call answering 254, or a call hang up 256.

Call connection 252 may occur when telephone 120 answers a call initiated by device 110. Such a state may apply when activating event 210 was, for example, call initiation 212. Call answering 254 may occur when device 110 answers an incoming call initiated by telephone 120. Such a state may apply when activating event 210 was, for example, call ringing 214.

Call hang up 256 may occur when the phone conversation between device 110 and telephone 120 ends, such as when either device 110 or telephone 120 hangs up. Such a state may apply when activating event 210 was, for example, either call initiation 212 or call ringing 214 and the connection may not have completed between device 110 and telephone 120.

After personalization content manager 137 receives notification of an ending event 250, personalization content manager 137 may stop (step 260) media player 112, after which personalization content manager 137 may return to wait state 200.

In accordance with a preferred embodiment of the present invention, Jill may have selected a different media file 134 (FIG. 1) for each activating event. Accordingly, personalization media file database 138 of device 110 may include, for example, a personalization media file 136A to be played for call initiation event 212; a second personalization media file 136B to be played for call ringing event 214 and a third personalization media file 136C to be played for end of call event 216.

It will be appreciated that more than one activating event 210 may occur during the course of a single connection between device 110 and telephone 120. For example, call initiation 212 may occur when device 110 calls device 120. Personalization content manager 137 may play associated media file 136A until, for example, call connection 252 occurs. Jack and Jill may then conduct a typical telephone conversation. When the telephone conversation ends, personalization content manager 137 may play the media file 136C associated with end of call 216.

Similarly, for example, call ringing 214 may occur when device 110 receives an incoming call from telephone 120. Personalization content manager 137 may play associated media file 136B until, for example, call answering 254 occurs. Jack and Jill may then conduct a typical phone conversation. When the telephone conversation ends, personalization content manager 137 may play the media file 136C associated with end of call 216.

It will be appreciated that additional examples of activating event 210 may occur at any time during the set up, execution, or end of a telephone call between device 110 and telephone 120.

In an alternative preferred embodiment of the present invention, such additional examples of activating event 210 may also be associated with unsuccessful attempts to complete a connection and conduct a typical phone conversation. For example, activating event 210 may be a busy signal, network congestion ("fast busy" signal), or call waiting. In accordance with this embodiment, Jill may select one or more media files 134 (FIG. 1) for these activating events 210 as well.

Figure 3A:
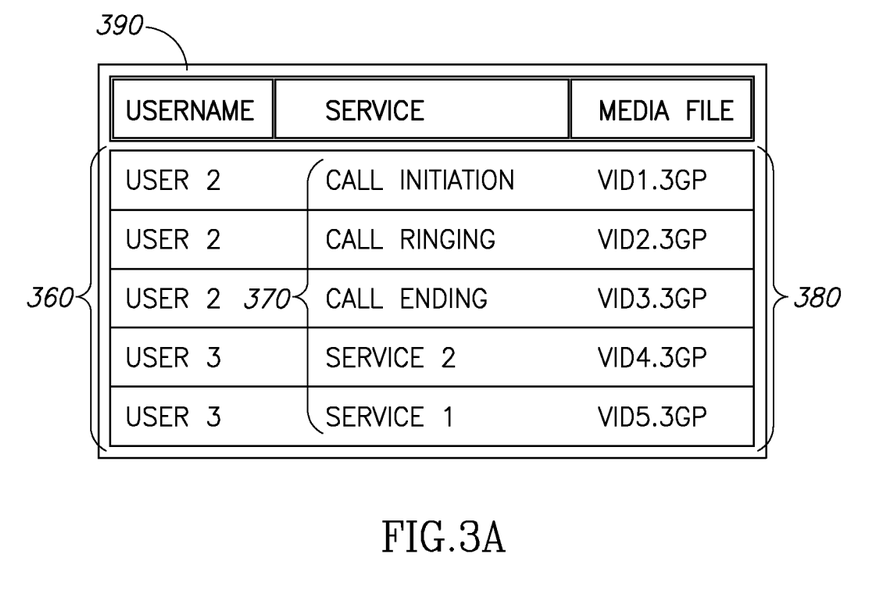
FIGS. 3A, 3B and 3C are illustrations of data files used by the system of FIG. 1.

Reference is now made to FIG. 3A which represents an exemplary user media table 390, which may be stored on community server 130. For every user 360 in table 390, there may be one or more records indicating activating events 370 and the associated media files 380 to play for each activating event 370.

In accordance with the embodiment of FIGS. 1 and 2, Jill may have selected the media file VID1.3GP for playing on the device of her buddies, whenever a buddy initiates a call (i.e. call initiation) to Jill. Jill may also have selected the media file VID2.3GP for playing on the device of her buddies, whenever she calls a buddy (i.e. call ringing). She may also have selected the media file VID3.3GP for playing on the devices of her buddies whenever a phone call between her and one of her buddies ends, regardless of who initiated the connection.

Other information which may be stored in the user media table 390 may include account information for the user, the content source, such as a universal resource locator (URL) for each media file 134 and/or a record of when the file was copied from the server to media file storage unit 138. It will be appreciated that the data in FIG. 3A is exemplary in nature and does not represent an exhaustive listing of the possible events for which Jill may select media files to play. For example, in accordance with an alternative preferred embodiment of the present invention, user media table 390 may also include selections of media files 134 to be played when a caller receives a busy signal, a "fast busy" signal, or call waiting.

In accordance with an alternative preferred embodiment of the present invention, user media table may also include selections of default media files 134 to be played when Jill is called by someone that does not meet any of the criteria for her other selections. For example, a caller may not be a member of community 150. It may also be possible that Jill's caller may be a member of community 150, but may not be Jill's buddy. Another possibility may be that Jill's caller may be indeed be her buddy, but that neither she nor such caller have previously selected a media file 134 to be played in such a situation. Jill may select one or more default media files 134 to be played in such situations.

Different versions of user media table 390 may be located on device 110 and on community server 130. Device 110 may store a local version, which may be a small portion of table 390 having the records of only those buddies of the owner of device 110. Community server 130, on the other hand, may store the entire table, for all the members of community 150.

Figure 3B:
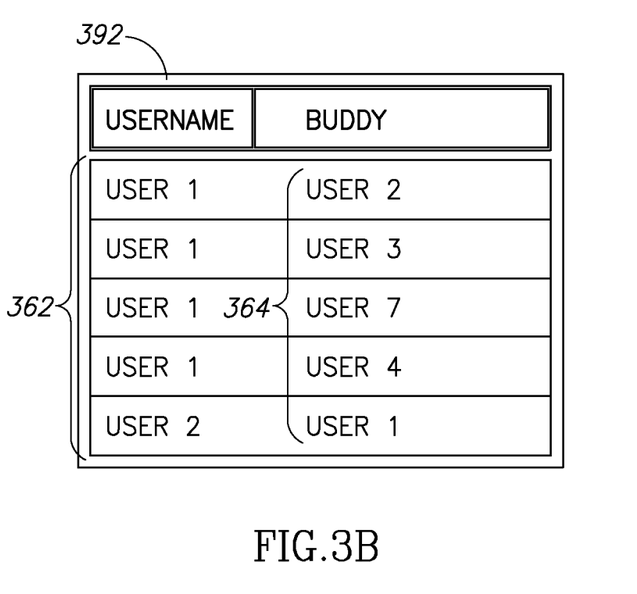

Reference is now made to FIG. 3B which illustrates a user-buddy table 392 that may be used to define relevant records to be stored in each local version of user media table 390. For every user 362 in table 392, there may be one or more records listing his buddies 364. In FIG. 3B, user 1 is listed as having buddies user 2, user 3, user 4, and user 7; and user 2 is listed as having user 1 as his buddy.

Figure 3C:
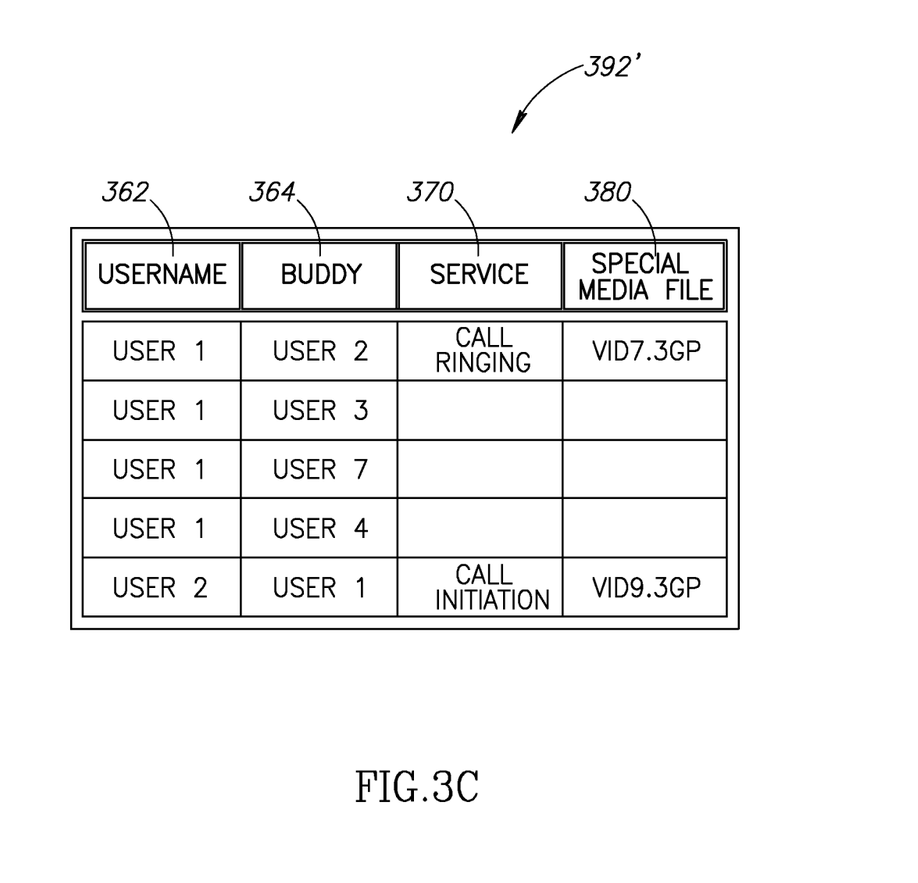

Reference is now made to FIG. 3C, which shows an alternative format for user-buddy table, here labeled 392'. Table 392' records users 362 and their buddies 364, as before. In addition, to enable users 362 to share different media files 380 with different buddies 364, buddy table 392' may record which media files 380 are to be shared with which buddy 364 for which type of activating event 370.

In accordance with a preferred embodiment of the present invention, community server 130 may update the local version of user media table 390 from time to time, as discussed hereinabove, with data stored in the server version of user media table 390. The update process may refer to buddy table 392 to determine which records to download to the local version as well as which files to download.

The update process may define a population of records in buddy table 392 where user 362 matches the name of the owner of device 110. The process may then download records from the server version of user media table 390 for the relevant user 362.

It will be appreciated that tables 390 and 392 may be updated and stored in other ways and such other ways are included in the present invention. For example, and not inclusive, tables 390 and 392 may be stored locally. Additions and changes to them may be generated on community server 130 and may be downloaded to device 110 at the appropriate moment. They may be deleted thereafter from community server 130.

Figure 4:
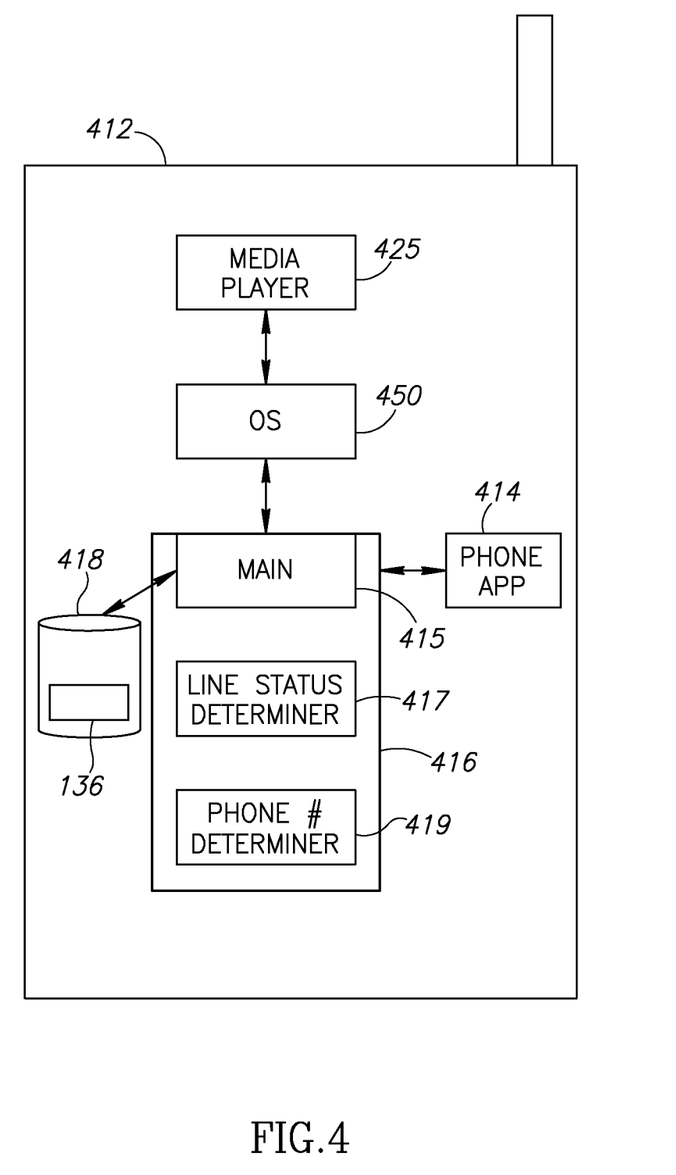
FIG. 4 is a schematic illustration of an exemplary mobile device forming part of the system of FIG. 1.

Reference is now made to FIG. 4, which details one exemplary device 412 with its personalization content manager, here labeled 416, implemented on a mobile telephone. Device 412 may comprise, as part of its feature set, an operating system 450, a media player 425 and a phone application 414, to which may be added personalization content manager 416 and a personalization storage unit 418.

Operating system 450 may provide connectivity between the elements of device 412, typically via operating system application programming interfaces (APIs). In accordance with a preferred embodiment of the present invention, the operating system of device 412 may be Symbian OS, commercially available from Symbian Ltd. of the United Kingdom. Alternative embodiments may include, for example, BREW, commercially available from QUALCOMM Incorporated of the United States, or derivatives of Microsoft Windows for mobile devices, such as Windows Mobile or MS SmartPhone, commercially available from Microsoft Corporation of the United States.

Phone application 414 may comprise, for example, all the functions necessary for device 412 to operate as a cellular telephone and may interface directly with operating system 450. Phone application 414 may pass phone number and caller id information to personalization content manager 416 through standard operating system APIs. Similarly, personalization content manager 416 typically may launch the media files via operating system 450, which may, in turn, start up media player 425.

Personalization content manager 416 may be started as a resident application when device 412 may be booted up. Manager 416 may remain in a dormant wait state until the user initiates a call to another device or when an incoming call is detected.

Personalization content manager 416 may comprise a main program 415, a line status determiner 417 and a phone number determiner 419. Line status determiner 417 may make API calls to operating system 450 to receive indications of when an activating event occurs. Line status determiner 417 may forward the status to main program 415. Main program 415 may activate phone number determiner 419 whenever line status determiner 417 may indicate that an activating event has happened and phone number determiner 419 may determine the phone number associated with the activating event. In one embodiment, phone number determiner 419 may monitor changes in a phone log (not shown) to find the currently active phone number. In another embodiment, phone number determiner 419 may register to receive the phone number whenever operating system 450 provides indications of a new event to line status determiner 417. Main program 415 may then use this phone number to look up the associated media file 436 in storage unit 418.

For some phones, operating system 450 may accord the highest processing priority to phone application 414 to ensure that the telephony services take precedence over the execution of other operations, such as the playing of media files. Similarly, phone application 414 will typically be in a window group with the highest z-order priority, which determines precedence for the display of application data on the device screen. Such z-order priority may interfere with the display of media file 136. Therefore, in accordance with a preferred embodiment of the present invention, main program 415 may raise the priority of the window group associated with media player 425 in order to enable its display to take precedence over the displays of phone application 414. Alternatively, main program 415 may raise the process priority of the process associated with media player 425 or with personalization content manager 416.

It will be appreciated that some cellular telephones may not gracefully handle such changes to priority of the window and/or of the process. The behavior may vary greatly in response to even minor changes in the handset model or embedded firmware. However, in accordance with a further preferred embodiment of the present invention, the properties of newer cellular telephone handsets may be utilized. Some handsets, such as the Sanyo MM-7500, allow the user to select video ringtones to be played in response to incoming calls. Certain of these handsets, such as the Sanyo MM-7500, even allow the user to specify specific video ringtones to be played in response to incoming calls from particular users.

In accordance with a further preferred embodiment of the present invention, such handsets may provide a programming API, accessible to downloadable applications similar to personalization content manager 416, that allows an upgraded manager to specify the video ringtone to be associated with a contact in the contact list. When such an API may exist, the upgraded manager may operate as follows:
   a. the upgraded manager may download the media content and an indication of which buddy to associate it with;
   b. the upgraded manager may pass the media content to the phone as the media content to be associated with the clip's owner who is already a member of the contact list.

When a call comes from a buddy, the built-in phone software may react to the caller-id and may play the associated media content properly.

Furthermore, in accordance with a further preferred embodiment of the present invention, such an API may also allow the registration of a video ringtone that would play at other activation events, such as call initiation 212, end of call 216, or the various busy indications (regular busy, fast busy or call waiting), such as described hereinabove. When such an API may exist, the appropriate media content may be played for each activation event and not just for call ringing.

As detailed in the embodiments, the media file 136 played when a given member of community 150 receives an incoming call may not have been selected by that same member. Indeed, depending on the number of associated buddies, it may be likely that a large number of constantly changing media files 136 may be played for incoming calls, such that a given member of community 150 may not recognize the fact that an incoming call is on his/her device 110. Accordingly, in a preferred embodiment of the present invention, members of community 150 may also select a "self ID" media file to be played before media file 136 for all incoming calls. With this, members of community 150 may recognize the incoming call as being on their devices 110 even though they may not recognize the sounds which follow.

Figure 5:
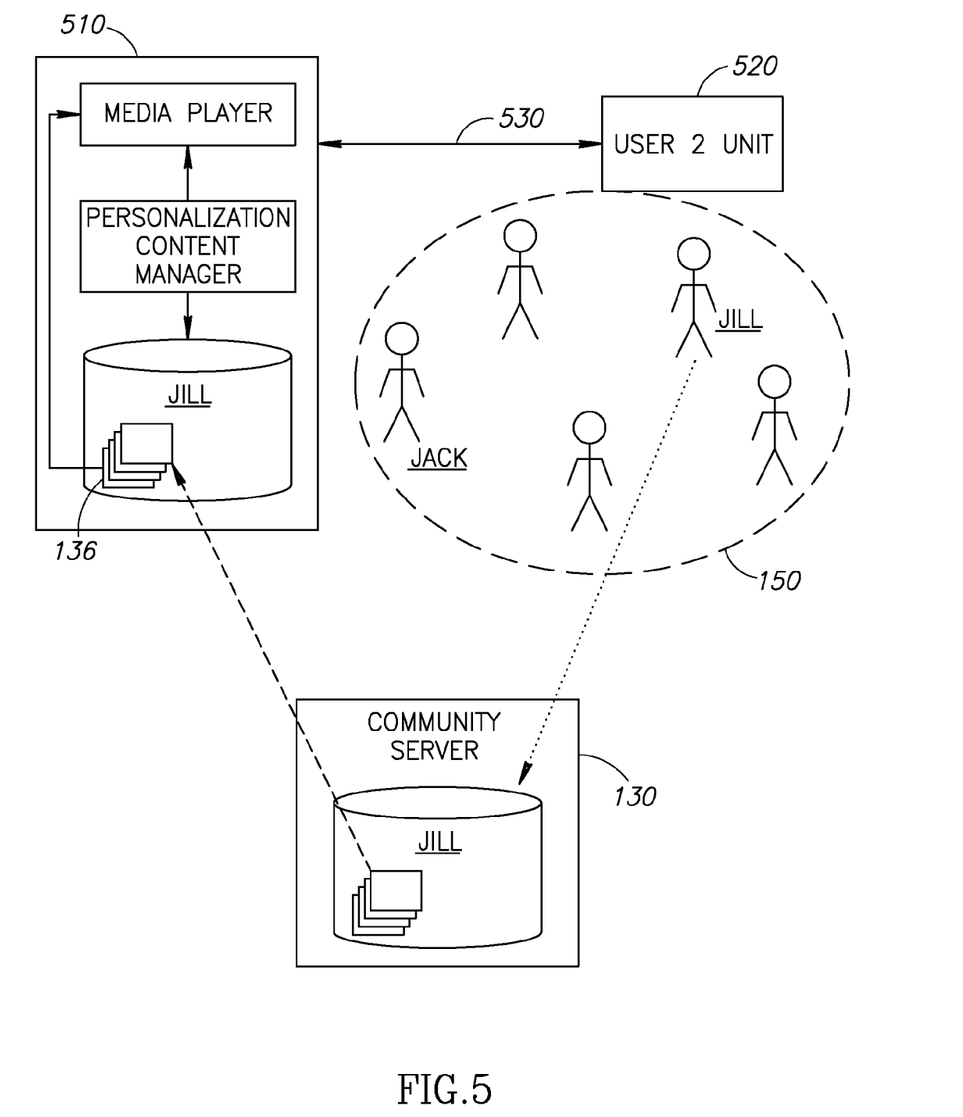
FIG. 5 is a schematic illustration of an alternative embodiment of the system of FIG. 1.

Reference is now made to FIG. 5 which illustrates a preferred embodiment of the present invention in which the playing of media file 136 may be occasioned by an event other than a voice connection between devices operated by Jack and Jill.

Playing device 510 may be owned by Jack and may be any programmable device capable of storing and playing media files. Such a device may be, for example, a desktop computer running VoIP software such as Skype, available from Skype Limited of Luxemburg, a handheld device having communication capabilities, or a soft phone. Jill's unit 520 may be any device or method by which Jill may contact, or be contacted by, playing device 510. As in the embodiment of FIG. 1, Jack and Jill, the owners of playing device 510 and unit 520, respectively, may be members of media content personalization sharing community 150 using community server 130 to select and download media files 136.

Activating event 530 may be associated with any form of communication between playing device 510 and Jill's unit 520, including, for example, email, SMS, instant messages, or VoIP. Activating event 530 may also be associated with any detail of such communication, including, for example, the timing, length, or contents of the communication, as well as the identity or presence state of the initiating entity.

It will be appreciated that, in addition to being a video file, an image or an audio file as discussed hereinabove, media file 136 may also be a request to invoke or launch a previously installed program or application. In the latter case, media file 136 is not necessarily played by a media player.

In accordance with an alternative preferred embodiment of the present invention, media file 136 may be an audio file, played at the end of a call. For such an embodiment, audio file 136, which may be much smaller than a video sequence, may be downloaded from the other party to the conversation (which may or may not be a buddy) at any time, including prior to the conversation or during the conversation for devices that can perform simultaneous voice and data transfer. For devices that cannot simultaneously transfer voice and data, the download may occur just after the conversation ends. This download may occur from the community server 130 or along the voice channel. In the latter embodiment, the network operator may provide media file 136.

Figure 6:
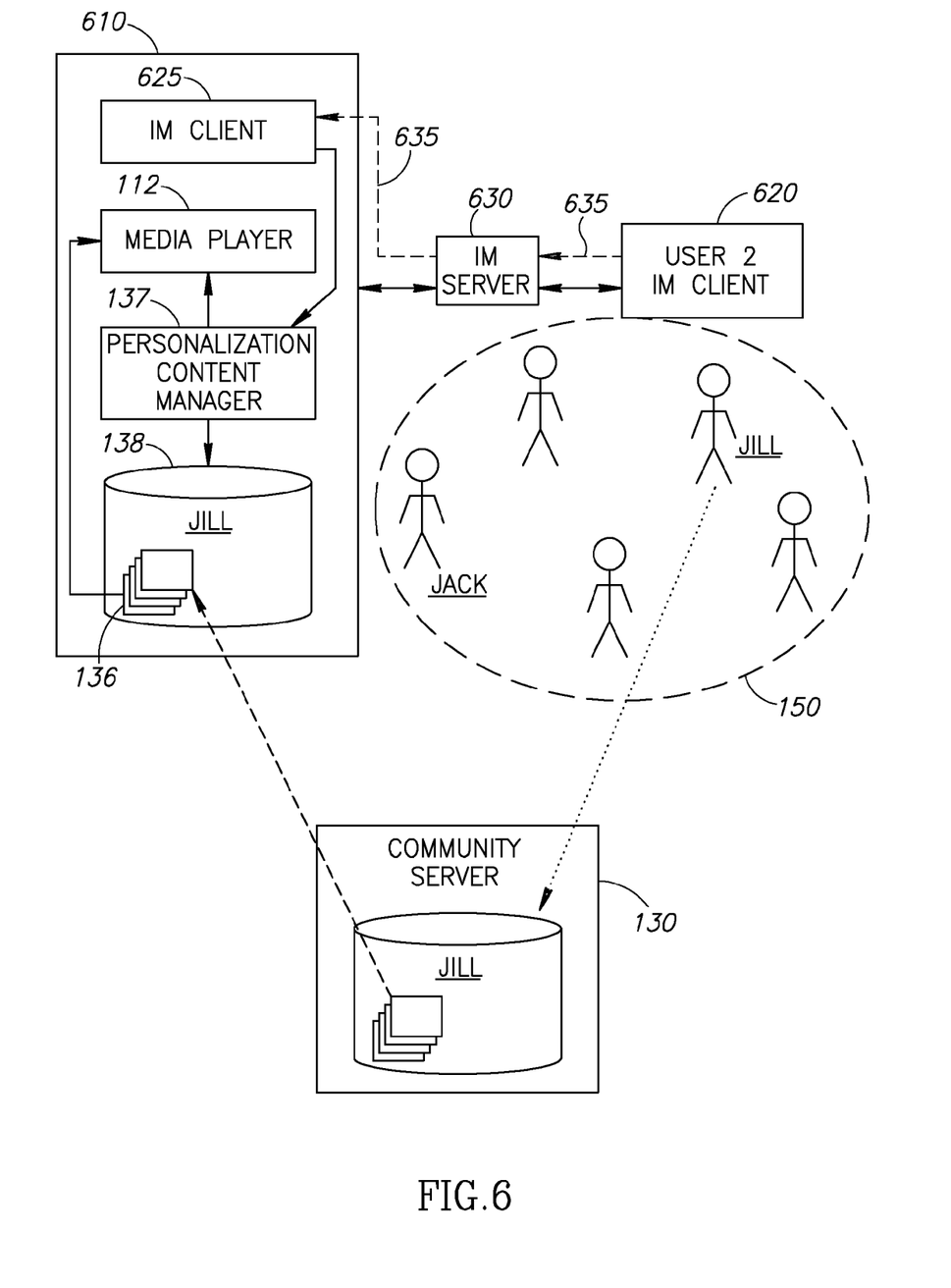
FIG. 6 is a schematic illustration of a further alternative embodiment of the system of FIG. 1.

Reference is now made to FIG. 6, which may describe a further alternative embodiment in which the communication channel may be an instant messaging (IM) channel between the users Jack and Jill. In this embodiment, the communication channel may include an IM server 630. Jill's device may be an IM client 620 and Jack's device 610 may include an IM client 625 in addition to media player 112, personalization content manager 137 and storage unit 138.

As is known in the art, instant messaging, also known as "IM" or "chatting", typically comprises the sending of textual messages, emoticons and/or animated emoticons, between two users, such as between Jack and Jill. In accordance with this embodiment of the present invention, Jill may additionally send Jack a triggering event, such as an identifier 635, during their conversation. An exemplary identifier 635 may be a file name, a number or a URL of media file 136 to be played.

Jack's IM client 625 may recognize identifier 635 and may transfer it to personalization content manager 137, along with some indication of the source of event 635 (e.g. Jill). As in the previous embodiments, manager 137 may retrieve media file 136 indicated by identifier 635 and may play it on media player 112. Prior to playing media file 136, manager 137 may additionally check to see that the source, e.g. Jill, was authorized to send identifier 635.

As in the previous embodiments, media file 136 may have been previously downloaded to Jack's device 610 from community server 130. Alternatively, it may be downloaded the first time that Jill may send identifier 635 and may be stored for later use when Jill may again send identifier 635.

It will be appreciated that IM server 630 may be implemented separately from or as part of community server 130. If servers 130 and 630 are implemented together, the combined server may perform part of the operation of IM client 625. Thus, the combined server may check to see that the source, e.g. Jill, was authorized to send identifier 635 and/or may download the associated file if it was not previously downloaded to device 610.

It will be appreciated that, as shown in FIG. 7 to which reference is now briefly made, personalization content manager 137 may be implemented in many different types of devices, of which four have been discussed above and three are shown in FIG. 7. In addition to smart phones, cellular telephones, programmable devices and devices that allow instant messaging, manager 137 may be implemented on any type of device and for any type of platform which has communication ability and media playing abilities. Such other types of devices include but are not limited to, mobile handsets, Skype, IM sessions, the new outside screen on laptops, IP (Internet Protocol) phones with color screens, caller id pop ups on televisions, etc.

Figure 7:
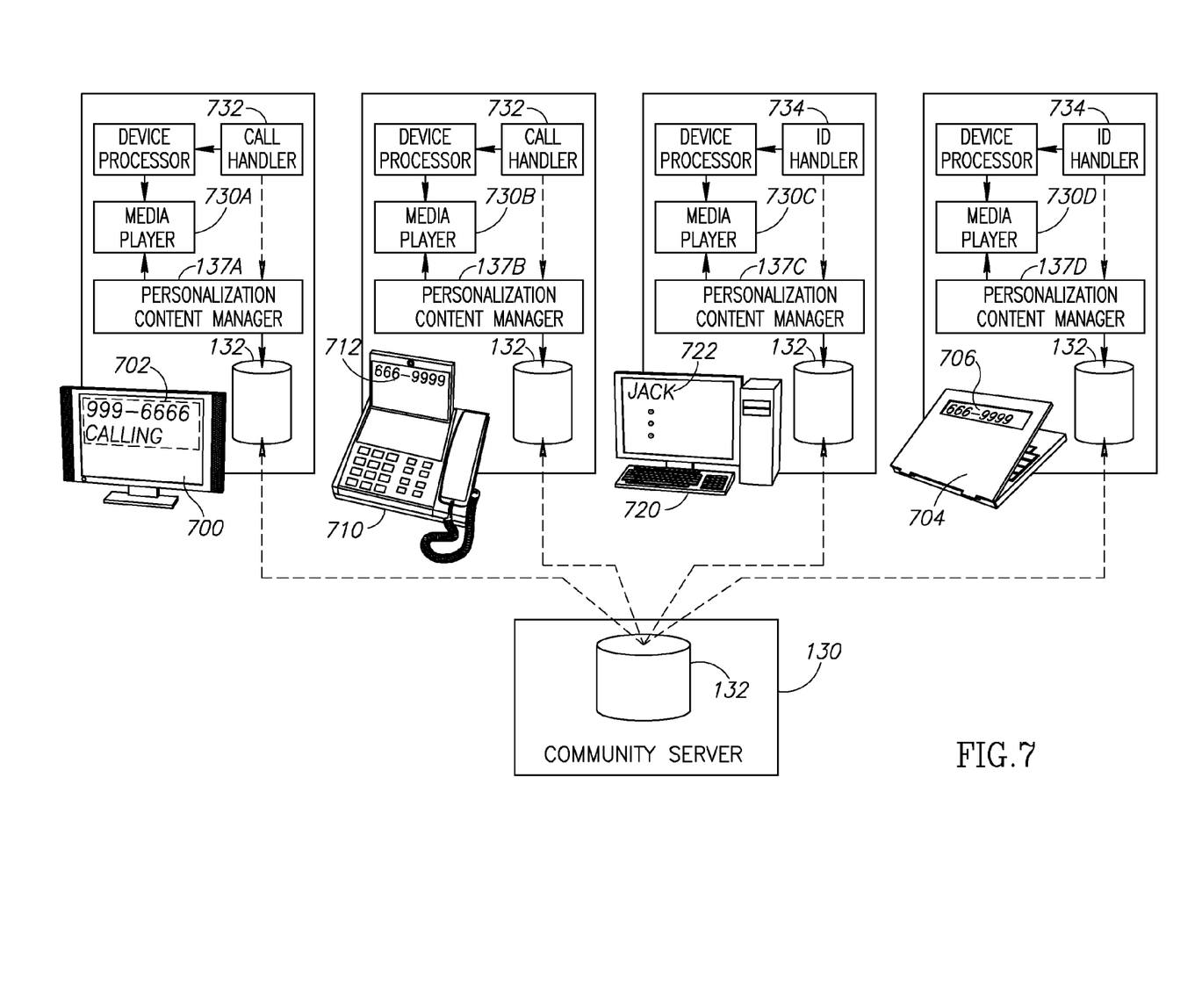
FIG. 7 is a schematic illustration of a multi-platform embodiment of the system of FIG. 1.

For example, FIG. 7 shows four exemplary devices, a television 700 with a caller id pop up 702, a laptop computer 704 with a secondary display 706 on the back of the cover, a video telephone 710 with a screen 712, and a personal computer 720 with a IM session 722, with their elements, including a device processor 701 to run the standard operation of the device.

The delivery mechanisms through which communication may occur are varied and may include, but are not limited to, IP, SIP (session initiation protocol), SMS (short message system), IVR (interactive voice response), etc. It will be appreciated that the personalization content sharing may be managed through community server 130, irrespective of the delivery mechanism.

Furthermore, while the personalization content manager may be different for each type of device and/or delivery mechanism and thus, is labeled 137A, 137B, 137C and 173D in FIG. 7, each manager may include at least main program 415 (not shown in FIG. 7), which may manage the downloading and storage of media content files 136 and may provide the media file associated with the current buddy to whatever media player, labeled 730A, 730B, 730C and 730D, the device may have. In some embodiments, main program 415 may provide media file 136 in response to receiving an identification of the current buddy from a call handler 732 or an identification handler 734 of the device. Typically, such identification is a caller ID type identification but other identifications, such as customer number, etc., may also be utilized. In other embodiments, where the device has the ability to play different media files per identification, main program 415 may provide the media file for association with a given buddy prior to its use.

Alternatively, if call handler 732 or ID handler 734 is not capable of providing the identification, manager 137 may determine it from other information available on the device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implementable on a communication device of a user, the method comprising:
    initially downloading a video clip to said communication device;
    identifying an end of call event between said user and another user; and
    playing the video clip by a media player of said communication device in response to said identifying.

2. The method according to claim 1 and wherein said playing comprises playing on a device which is one of:
    a soft phone;
    a mobile telephone;
    a device capable of at least of voice communication, media playing and local storage;
    a device capable of at least instant messaging, media playing and local storage; and
    a device capable of at least identifying another party of a communication, media playing and local storage.

3. The method according to claim 1 and wherein said playing comprises playing on a device which is one of the following devices: a mobile telephone, a smart phone, a programmable device, a device that allows instant messaging, a VoIP (voice over internet protocol) device, an outside screen on a laptop, an IP (internet protocol) phone with a media screen, and a caller id pop up on a television.

4. The method according to claim 2 and also comprising storing said video clip on said device.

5. The method according to claim 1 and wherein said conversation is associated with a telephone conversation.

6. The method according to claim 1 and wherein said conversation is an instant messaging conversation.

7. The method according to claim 4 and wherein said video clip is selected by a first user for playing on the device of a second user.

8. The method according to claim 7 wherein said playing comprises:
    identifying the user associated with said end of call event;
    selecting said media content of said identified user for said identified end of call event; and
    playing said selected media content.

* * * * *